(12) United States Patent
Bullock

(10) Patent No.: US 9,613,466 B1
(45) Date of Patent: Apr. 4, 2017

(54) SYSTEMS AND METHODS FOR DRIVER IMPROVEMENT

(71) Applicant: Brian Lee Bullock, Lone Tree, CO (US)

(72) Inventor: Brian Lee Bullock, Lone Tree, CO (US)

( * ) Notice: Subject to any disclaimer, the term of this patent is extended or adjusted under 35 U.S.C. 154(b) by 225 days.

(21) Appl. No.: 14/047,980

(22) Filed: Oct. 7, 2013

Related U.S. Application Data

(63) Continuation of application No. 13/584,738, filed on Aug. 13, 2012, now Pat. No. 8,554,468.

(60) Provisional application No. 61/522,933, filed on Aug. 12, 2011.

(51) Int. Cl.
    *G01C 21/00*     (2006.01)
    *G07C 5/00*     (2006.01)

(52) U.S. Cl.
    CPC ..................... *G07C 5/00* (2013.01)

(58) Field of Classification Search
    CPC ........ G07C 5/008; G07C 5/0841; G07C 5/02; G07C 5/085; G08G 1/20; G08G 1/052
    USPC ................... 701/101, 23, 400, 300
    See application file for complete search history.

(56) References Cited

U.S. PATENT DOCUMENTS

| | | | | |
|---|---|---|---|---|
| 6,547,343 B1 * | 4/2003 | Hac | ...................... | B60T 8/1755 303/140 |
| 6,618,667 B1 * | 9/2003 | Berwanger | ............ | G08G 1/092 340/6.1 |
| 6,973,322 B2 * | 12/2005 | Buchmann | ............... | H04W 4/02 340/905 |
| 7,096,100 B2 * | 8/2006 | Arata | ..................... | G01C 21/34 340/905 |
| 7,343,242 B2 * | 3/2008 | Breitenberger | ...... | G08G 1/0104 340/905 |
| 7,983,836 B2 * | 7/2011 | Breed | ..................... | G08G 1/161 340/441 |
| 8,290,695 B2 * | 10/2012 | Hiestermann | .......... | G01C 21/32 15/42 |
| 8,306,731 B2 * | 11/2012 | Waggaman, III | ...... | G06Q 10/06 340/438 |
| 8,395,529 B2 * | 3/2013 | Seder | .................... | G01S 13/723 340/905 |
| 8,416,067 B2 * | 4/2013 | Davidson | ............... | G06Q 10/08 340/426.1 |
| 2004/0236474 A1 * | 11/2004 | Chowdhary | ....... | G06Q 30/0601 701/1 |
| 2005/0232469 A1 * | 10/2005 | Schofield | .......... | G06K 9/00818 382/104 |
| 2007/0268146 A1 * | 11/2007 | Itou | ........................ | G08B 21/06 340/576 |
| 2008/0021640 A1 * | 1/2008 | Pyo | ..................... | G01C 21/3641 701/533 |
| 2008/0255722 A1 * | 10/2008 | McClellan | ............ | B60R 25/102 701/31.4 |
| 2008/0319602 A1 * | 12/2008 | McClellan | ............. | G07C 5/008 701/31.4 |
| 2009/0079555 A1 * | 3/2009 | Aguirre De Carcer | ................... | G07C 5/008 340/441 |

(Continued)

*Primary Examiner* — Redhwan k Mawari
(74) *Attorney, Agent, or Firm* — Booth Udall Fuller, PLC

(57) ABSTRACT

Disclosed are systems and methods for driver performance assessment and improvement. The systems and methods may be: active for warning purposes only; passive for monitoring purposes only; and active and passive. Any of the foregoing system and methods may be cooperative as well.

6 Claims, 8 Drawing Sheets

(56) References Cited

U.S. PATENT DOCUMENTS

| | | | |
|---|---|---|---|
| 2009/0299546 A1* | 12/2009 | Hac | B60G 17/0162 701/1 |
| 2011/0054783 A1* | 3/2011 | Kishikawa | G01C 21/3632 701/533 |
| 2011/0238457 A1* | 9/2011 | Mason | G01C 21/3469 705/7.14 |
| 2012/0010764 A1* | 1/2012 | Hamada | G01C 21/32 701/2 |

* cited by examiner

US 9,613,466 B1

SYSTEMS AND METHODS FOR DRIVER IMPROVEMENT

CROSS REFERENCE TO RELATED APPLICATIONS

This application is a continuation-in-part application of the earlier U.S. Utility Patent Application entitled "SYSTEMS AND METHODS FOR DRIVER PERFORMANCE ASSESSMENT AND IMPROVEMENT," application Ser. No. 13/584,738, filed Aug. 13, 2012, which application claims the benefit of the filing date of U.S. Provisional Patent Application, Ser. No. 61/522,933, filed Aug. 12, 2011, the disclosures of which are hereby incorporated entirely herein by reference.

BACKGROUND

1. Technical Field

Aspects of this document relate to systems and methods for driver performance assessment and improvement. An alert may be provided based on road location and/or other data. The alert may include information indicating the reason for the alert provided. As a result of receiving the alert, the driver may adjust their route or driving behavior.

2. Background Art

National Highway Traffic Safety Administration (NHTSA) data for 2009 showed that 32.7% of large truck accidents were the result of failure to stay in the lane of travel (e.g., truck crossing median, rollover, and collisions with fixed objects). These types of accidents resulted in 826 deaths and 15,000 injuries in 2009 according to NHSTA statistics. However, these numbers just reflect accidents that resulted from loss of control by the truck driver. Safety in the trucking industry continues to be a significant concern as fatal accidents rose 8.7% from 2009 to 2010. On a typical day in the US large trucks have 8 fatal crashes causing 10 deaths, 140 injury crashes and 636 property damage only crashes costing the industry in total over $100 million per day.

Many large trucks are now equipped with GPS tracking systems that record and report the location, the speed of the truck, and brake and throttle behavior of the driver. Recent experience with monitoring truck speed and braking behavior by drivers has been used by fleet managers to offer remedial training to drivers that resulted in up to 45% reduction of certain types of accidents related to driving behavior which was discovered through the driver's use of the brakes.

SUMMARY

Aspects of this document relate to driver performance assessment and improvement systems and methods. These aspects may comprise, and implementations may include, one or more or all of the components and steps set forth in the appended CLAIMS, which are hereby incorporated by reference.

In one aspect, a driver improvement method includes: one of inputting via a global positioning satellite (GPS) enabled computer and pre-installing onto the GPS enabled computer information on vehicle configuration and load parameters; automatically, via the GPS enabled computer, locating the vehicle and determining its direction of travel and speed once driving is underway; automatically, via the GPS enabled computer, selecting a road segment that the vehicle is traversing from a linked map data base that contains accurate three dimensional characterizations of road centerlines, curve radii and slopes; and automatically, via the GPS enabled computer, calculating a recommended safe speed (RSS) that the vehicle can use to transit a next road segment from the information on vehicle configuration and load parameters along with the curve radii and slopes.

In another aspect, a driver improvement method includes: one of inputting via a global positioning satellite (GPS) enabled computer and pre-installing onto the GPS enabled computer information on vehicle configuration and load parameters; automatically, via the GPS enabled computer, locating the vehicle and determining its direction of travel and speed once driving is underway; automatically, via the GPS enabled computer, selecting a road segment that the vehicle is traversing from a linked map data base that contains accurate three dimensional characterizations of road centerlines, curve radii and slopes; automatically, via the GPS enabled computer, selecting a recommended safe speed (RSS) from a data base that has been created by previously calculating the RSS that the vehicle can use to transit a next road segment from the information on vehicle configuration and load parameters along with the curve radii and slopes; and automatically, via the GPS enabled computer, providing the RSS to a driver in the form of an alert.

In still another aspect, a driver improvement method includes: one of inputting via a global positioning satellite (GPS) enabled computer and pre-installing onto the GPS enabled computer information on vehicle configuration and load parameters; automatically, via the GPS enabled computer, locating the vehicle and determining its direction of travel and speed once driving is underway; automatically, via the GPS enabled computer, selecting a hazardous road segment that the vehicle is about to traverse from a linked map data base that contains road segments identified as high hazard locations or road segments with a history of a high frequency of crashes; and automatically, via the GPS enabled computer, providing the selected hazardous road segment to a driver in the form of an alert that the vehicle is about to enter the selected hazardous road segment.

For each of the foregoing aspects, particular implementations may include one or more or all of the following.

A method may further include automatically, via the GPS enabled computer, assessing driver performance through the selected hazardous road segment. This may be accomplished by: automatically, via the GPS enabled computer, recording actions of the driver as well as actual speed and accelerations as the vehicle traverses the selected hazardous road segment; automatically, via the GPS enabled computer, transmitting the recorded driver behavior and other information to a server for storage and analysis; and automatically, via the server, analyzing the recorded driver behavior and other information to score driver performance.

A method may further include selecting a road segment that the vehicle is traversing from a linked map data base that contains accurate three dimensional characterizations of road centerlines, curve radii and slopes, and pre-calculated RSSs for various vehicle types, loads and trailer configurations.

A method may further include automatically, via the GPS enabled computer, predicting the path of the vehicle.

A method may further include an on-board GPS enabled computer.

A method may further include one of a factory installed navigation system, a factory installed GPS tracking system, an after-market stand-alone GPS navigation system, an after-market stand-alone GPS tracking system, a smartphone, and a tablet computer.

A method may further include: automatically, via the GPS enabled computer, recording actual measurements of lateral accelerations for each road segment and comparing the actual measurements to predicted lateral accelerations; automatically, via the GPS enabled computer, estimating bank angles by a difference between the measured lateral accelerations and the predicted lateral accelerations; and automatically, via the GPS enabled computer, adding the bank angles to the database to improve subsequent forecasts of RSS.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations are illustrated by way of example, and not by way of limitation, in the figures of the accompanying DRAWINGS and in which like elements refer to similar elements.

DESCRIPTION

Figure 1:
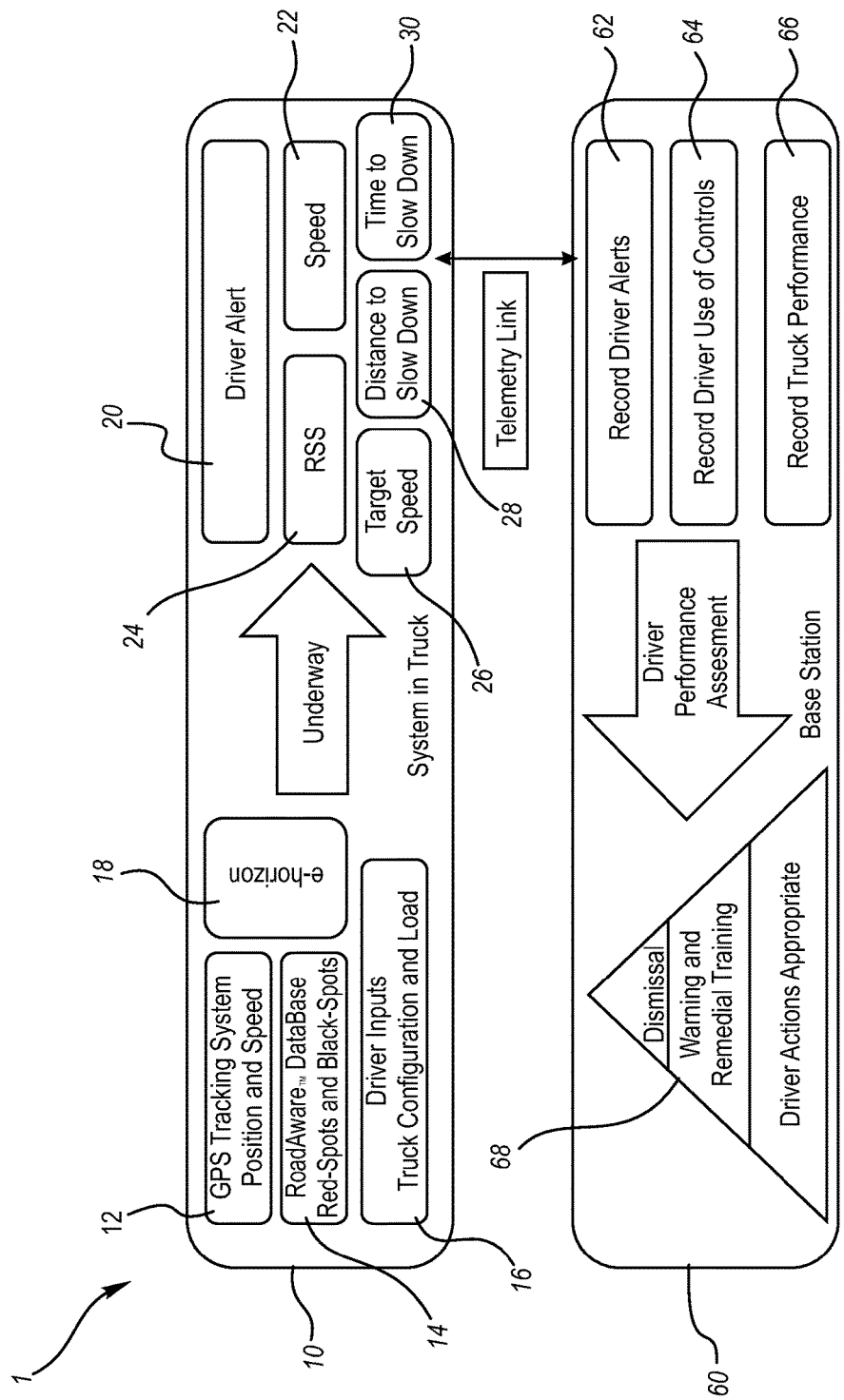
FIGS. 1-3 are block diagrams of a driver performance assessment and improvement system and sub-systems, respectively.

There are many features of implementations of systems and methods for driver performance assessment and improvement disclosed herein, of which one, a plurality, or all features or steps may be used in any particular implementation. The aspects, features, and advantages of driver performance assessment and improvement system and method implementations will be apparent to those of ordinary skill in the art from the DESCRIPTION and DRAWINGS, and from the CLAIMS.

In this document, reference is made to the accompanying DRAWINGS which form a part hereof, and which show by way of illustration possible implementations. It is to be understood that other implementations may be utilized, and structural, as well as procedural, changes may be made without departing from the scope of this document. As a matter of convenience, various components will be described using exemplary specifications. However, this document is not limited to the stated examples and other configurations are possible and within the teachings of the present disclosure.

Overview

This document features precise 3D map based curve and slope speed monitoring and/or warning system and method implementations plus alerts and warnings issued when a vehicle is entering highway segments or locations with difficult road geometry or high frequency of accidents for example. Rollovers, lane departures, and speed on down slopes are caused by a combination of factors, including road geometry, loss of traction, truck physical parameters, type of load, and driver behavior for example. Since drivers generally have no control over the road or the physical characteristics of their trucks, they must adapt their driving behavior to the conditions. If it is assumed that the truck's forward path is fixed to the center of its current lane (which is generally the case, except in lane changing), the only way to avoid dangerous lateral accelerations is to control the truck's longitudinal speed. Driver performance assessment and improvement system and method implementations, therefore, can determine the recommended safe speed (RSS) (e.g., a speed beyond which it becomes unavoidable that the truck will eventually roll over or lose braking authority causing a loss of control) given the conditions, and in some implementations flags and reports dangerous driving behavior, while in other implementations warns the driver when he is in danger of exceeding it.

Implementations may use systems, methods, computer programs, and/or databases (e.g. of hazardous locations), or any combination of systems, methods, databases and/or computer programs.

Thus, in general, the computerized method and software for driver performance assessment and improvement analysis application may be executed on a computer platform. The computer platform accesses data from a database or databases (e.g., server database(s) at a base station and/or onboard database(s)), including data obtained from various data sources and can provide driving condition alerts. The databases may be maintained within the computer platform, or may be separately maintained databases, such as databases on a server accessed through a computer network. The computerized method for driver performance assessment and improvement analysis involves inputting selected data from the database(s) into the computer platform. For example, the computing platform may include two databases, one database that holds local, pre-loaded data used by the application, and one database that holds external data used by the application that is acquired via a receiver. However, the computing platform may have a single database or more than two databases.

The computer platform may have a microprocessor operable to execute an application (a coded set of program instructions) connected by a bus to an area of main memory, including read only memory (ROM) and/or random access memory (RAM), and a storage device having means for reading an application, which may be loaded on a computer readable medium (e.g., into main memory) and executed by the microprocessor. The computer platform may have a display device, a keyboard or keypad, and may include other input devices, a mouse or track pad, speaker(s), and the like. A network communication interface may also be provided for serial communications on a network or other serial communications link. Additionally, the computer platform may include a Small Computer System Interface (SCSI) adapter for communication with peripheral devices, including data sources.

Data may be associated with position or location information. The location information may include geographical coordinates (e.g., latitude, longitude, and altitude), traffic codes (e.g., Radio Data System Traffic Message Channel (RDS-TMC) codes and Vehicle Information and Communication System (VICS) codes), road segment identifications, grid or tile identifications, and/or any other method of identifying a location in the real world. For example, data may be associated to specific road segment identifiers.

External real-time data may be sent periodically (e.g., every half hour) or intermittently (e.g., as changes occur) via a wired or wireless connection to the receiver of the computing platform in the form of one or more data feeds, such as an RSS or XML feed for example. The receiver may be any device or combination of devices operable to receive the external data and store it in a database. The receiver may also convert the external data into a format used by the processor prior to storing the data in a database.

The map data represents the road network in a geographic area. The map data includes the physical locations (geographic coordinates, including altitude) of roads and data representing the three-dimensional shape of the roads (e.g., curvature, slope, elevation, grade, bank, width), regulations (e.g., speed limits, turn restrictions, direction of travel), lane characteristics (e.g., number, width, markings, changes), road type (e.g., bridge, tunnel, pavement type), the locations of medians, road signs, intersections, road names, addresses, and so on. The map data may also include information about other geographic features, such as bodies of water, parks, administrative areas (including municipal, state and country boundaries), and locations of points of interest, such as businesses, hospitals, police stations, and so on.

The application is a software program or routine that runs on the computing platform to analyze the data in the database(s) and to determine whether driving conditions exist that require an alert. The application is stored on computer-readable storage media and run by the processor on the computing platform. The computer-readable storage media may be located within the memory of the computing platform, such as ROM, RAM, and hard disks. Alternatively, the computer-readable storage memory may be located external to the computing platform on a server, on a flash drive, or a CD-ROM disc for example, which is accessed by the computing platform when the memory is connected to computing platform. In any event, the processor executes the application and a transmitter transmits recorded data to a server and alert messages when the application determines that a driving condition exists that requires an alert.

The processor controls the distribution of the data from the database(s) to the application. The application may use map data in conjunction with a combination of other real-time (collected data that is delivered to the computing platform in a timely manner with delays as needed to transfer the data from the data collection point to the computing platform), historic, and forecast, such as traffic, weather, road surface conditions, accurate three dimensional road centerline data, terrain model, speed, acceleration, vehicle configuration and load, data acquired from other connected vehicles such as wheel spin on other vehicles that could indicate icy or wet conditions or hard stops performed in front of a vehicle, and/or other data to determine whether to generate an alert. 3D road centerline data in electronic form may be procured from various suppliers and added to the GPS tracking system through an electronic download or a flash drive for example.

External data includes at least the data that is likely to change at a rate such that frequent updates (daily or more often) to the database(s) are used to generate the alert. Other data, such as historic data, may be stored in a different database, and may be updated at a less frequent rate (as part of a routine update, such as a monthly update for example). The computing platform may receive map data from external sources as needed for a particular analysis performed by the application.

The application analyzes the received data. The application may start with a data baseline of expected conditions. The analysis identifies changes from a baseline. Of course, the analysis may also be conducted without using a baseline. With or without a baseline, the application uses one or more analytical routines or methodologies to identify driving conditions that are appropriate for generating an alert. For example, the driving condition application 114 may use a decision tree, an object model, a neural network, an algorithm, a genetic algorithm, and/or the like. The driving condition application may use other methodologies now known or developed in the future to analyze the data as well.

The application may generate an alert message based on data or a combination of data stored in the database(s) and/or external data, which is received by the computing platform via a receiver and stored in a database. If the application generates an alert message, the processor provides the alert message to users via the display device and/or speaker(s) or to other users of different computer platforms via a transmitter. The alert message can be provided as an audible alert, a visual alert, a haptic alert, and/or any other type of alert to the user (e.g., driver and/or fleet manager).

Thus, for the exemplary purposes of this disclosure, the computing platform may be any existing, installed GPS tracking system hardware. For example, the GPS tracking system hardware products known as Mobile Computing Platform, models MPC110, MPC200, and MPC50, made by QUALCOMM®, San Diego, Calif., are incorporated herein by reference and may be used and modified, programmed with applications, and the like according to this disclosure. Other platforms may be used as well, such as Personal computers, Personal Navigation Devices, Servers, Smartphones, Tablet computers, a plurality of computers coupled together for parallel computing applications, and any other computer or computer system, mobile or traditional, for example.

Thus, in general, system implementations may use existing GPS tracking system hardware coupled with accurate three dimensional road centerline data to calculate RSS for a vehicle under various load conditions and trailer configurations to negotiate curves or downgrades for example. System implementations can also issue alerts and warnings to drivers as they enter areas with a high frequency of accidents for example. System implementations can be implemented in passive and/or active configurations.

Passive System

In one aspect, a system and method is disclosed for monitoring purposes only. The passive system configuration can be employed at the fleet operations center for example for driver performance assessment and improvement without real-time RSS calculations and warnings. Such a system could be announced to drivers so that they would know that operations will be collecting and analyzing data, calculating super elevation and average speeds so that poor performance can be flagged and remedial actions taken. While other conventional systems currently collect information on driver behavior and have scoring systems, the sampling is random, periodic or event based. This passive system will allow the fleet manager to intelligently collect and analyze data by recording when the vehicle is traveling through the most hazardous segments of the road. Data can be recorded for all segments of the trip, not just the most hazardous so fleet managers can compare actual performance to preferred operating parameters. These preferred operating parameters can be calculated using the Horizon Module or established by how other drivers navigate the same segments of road. This data can be used to slow down drivers to create a safer driving environment or speed drivers up to maximize company efficiency at times when vehicle safety is not at risk.

In general, this passive system configuration allows the fleet manager to collect performance data (e.g., position, speed, lateral acceleration, driver actions and driver inputs) from the GPS and CAN bus of the truck when the truck is passing through a road segment with high accident frequency or difficult road geometry. The performance data is sent by telemetry to the base station or unit of the GPS tracking system where it is accumulated in the driver's file in a database on a server for example. An automated system analyzes the trip (e.g., such an analysis could have a particular focus on truck performance in hotspots (Red-spot segments with high curvature or slopes or Black-spot segments with high accident frequency)). Dangerous driving behavior is automatically flagged and reported for immediate action. Repeated poor or marginal performance is accumulated and used as the basis for remedial driver training or other consequences, such as dismissal.

Specifically, this passive system can be employed for improving driver performance in commercial fleet management. Initially, an on-board GPS tracking computer of the passive system can prompt a driver or the fleet operations worker or manager for example at the beginning of a journey to input information on vehicle configuration and load parameters (e.g., type of load and load height).

Once the journey has begun, the on-board GPS tracking computer can automatically locate the vehicle and determine its direction of travel and speed. From this position and direction information, the on-board GPS tracking computer can automatically select a road segment that the vehicle is traversing from an on-board database or linked map database on a server.

The passive system will use the 3D road geometry coupled with vehicle dynamics specific to each semi-truck and load configuration to calculate a RSS. The RSS will be set at the lower of: a) the braking capacity of the truck and the steepness of the slope; or b) the lateral tipping forces for the load type and the radius of the upcoming curve.

Thus, for example, the database may contain calculations of RSS for various truck loads and configurations for segments of the road with difficult or hazardous road geometry that have been previously selected and are called Red-spots. The Red-spots contained in the database are calculated using accurate three-dimensional characterizations of road centerlines, curve radii and slopes coupled with vehicle dynamics algorithms which take overturning forces into consideration and braking energy for heavy loads descending along a steep grade. The selection of these Red-spot locations is based upon an automated analysis of road geometry and the use of precise terrain data. The algorithms and software used for this analysis are proprietary and use multiple data sets to provide the required accuracy. The RSS in each Red-spot can vary from point to point depending on grade and turn radius and vehicle dynamics. The variations will be supplied to the driver as the vehicle transits through the Red-spot. Current conventional GPS tracking systems are not referenced to accurate 3D road maps (do not have a link to accurate road centerline data), nor do they have the vehicle dynamics algorithms to calculate RSSs through curves.

The on-board GPS tracking computer with a path prediction application or software module (e.g., e-Horizon Module) then uses the foregoing information to automatically predict the path of the vehicle. The on-board GPS tracking computer then automatically selects the RSS that the vehicle can use to transit a next road segment from the information in the database.

The passive system can provide a set of driver alerts and messages before the vehicle enters such a Red-spot (e.g., winding roads, sharp curves, steep slopes, and the like). The on-board GPS tracking computer also automatically issues alerts to the driver within a look-ahead distance sufficient for the vehicle to be slowed to a safe speed for the upcoming road segments (i.e., the time and distance required to decelerate through the differential speed) based on the calculations specific to the load, road geometry and truck configuration. The look ahead distances may also have been performed previously and stored in the database or calculations performed in real time if safe speeds are not calculated in advance.

The passive system may also contain a database of accident Black-spots (may be the same database for the Red-Spots). Black-spots are segments of the roadway or intersections with a history of high accident (e.g. fatal accidents) frequency. The BlackSpot database can also be used to identify, by municipality, county or state, the: deadliest road segments overall; deadliest segments of an Interstate; deadliest segments of an urban highway; deadliest segments of a rural highway; and deadliest intersections.

These Black-spot locations are based upon a proprietary geospatial statistical analysis. Using years of historical data, these locations have been identified and clustered, enabling alerts to be issued to drivers of dangers that may not be apparent and providing drivers the opportunity to drive more defensively. The analysis consists of a set of processes to buffer and clip the data, cluster the data, and set thresholds for severity. Great care is being taken to preserve the underlying integrity of the data while creating a useful product that will not issue warnings so frequently that they are tuned out by the driver or so infrequently that the driver forgets to drive defensively. Black-spots can be in conjunction with RedSpots or by themselves as a safety warning to drivers.

The on-board GPS tracking computer can automatically select a road segment that the vehicle is traversing from an on-board data base or linked map data base on a server and issue alerts (e.g., provide a set of driver alerts) as the vehicle approaches an accident Black-spot. The driver may thus be warned to exercise defensive driving techniques as the vehicle transits through the Black-spot. The driver may be given another notice as the vehicle leaves the accident Black-spot. The driver alerts can be audible and/or visual and varied in intensity and/or color for example to reflect the severity of the accident history or the speed while a driver is approaching an upcoming section of roadway.

Thus, Black-spot alerts add safety to system implementations by: Providing in-cab audible and visual warnings to drivers; Providing the ability to route around dangerous sections of road; Providing the ability to track and rate drivers in high risk areas; and Keeping drivers alert and more aware of their surroundings. Black-spot alerts also add value to providers of safety to, fleet management, or driver evaluation systems by providing a positive return on investment (ROI) by reducing costs for crashes.

The on-board GPS tracking computer then automatically records the actions of the driver as well as the actual speed and accelerations as the vehicle traverses a particular road segment in a driver performance file. Thus, among the data collected are vehicle position GPS data (latitude, longitude, altitude, time stamp), GPS error estimate (GPS fix, differential age, DOP, etc.), direction of travel, and vehicle speed. The system may also collect measured lateral acceleration, vehicle operational parameters (brakes, accelerator pedal, wiper movement, etc.), and lane-tracker information (offsets to lane marks) for example.

This recorded driver behavior and other information is then transmitted via the transmitter of the on-board GPS tracking computer to a server at fleet headquarters for storage and analysis. The server automatically analyzes the reported driver behavior and other information to score driver performance. The server then automatically sends driver performance scores to a fleet manager who can notify poorly performing drivers and take appropriate action, which may include a warning, remedial training or dismissal for example.

It is also possible to determine RSS in curves and on descents by creating a standard using other drivers who navigate the same section of highway. When a trusted driver navigates a section of road, driver performance is transmitted back to a server and that data is used to create a standard that other drivers can be compared to. It is also possible to create a standard with the performance of many drivers and use statistical analysis to remove outliers or risky performance. These standards can either be used to rate other drivers or to create RSS for drivers (in other words, used either passively or actively). These created standards can be mathematically adjusted as needed based on vehicle dynamics and driver experience or can be used without adjustments. These standards can be created for Red-Spots, Black-Spots, and all segments of road. Fleet managers can use these standards to not only slow drivers in dangerous segments of highway, but to maximize company efficiency by helping drivers make up valuable time in safer segments of road.

Active System

In another aspect, a system and method is disclosed for warning purposes only. In general, the active system configuration will display the RSS for the driver and provide warnings with sufficient time for the driver to reduce speed to the RSS for the next maneuver. The active system then records the driver's performance through the curve or downgrade. The active system will also access data from the CAN bus of the truck to alert the driver to possible deterioration in the condition of the road surface such being wet or the possibility of ice and will provide suggested speeds for such conditions. A CAN bus is a vehicle controller area network bus standard designed to allow microcontrollers and devices to communicate with each other within a vehicle without a host computer. CAN bus is a message-based protocol, designed specifically for automotive and truck applications.

An additional feature of the active system is that it will accumulate actual data on lateral accelerations on each curve from data logs of the accelerometers on the vehicle. Super elevation can be calculated by comparing actual measured lateral acceleration with predicted values. These data will be used to refine the suggested safe speeds for each curve. This avoids false warnings that would annoy the driver and reduce effectiveness. In addition the active system can record and report fuel consumption to encourage driving behaviors that conserve fuel.

As a specific example, an active system can be employed for improving driver performance in commercial fleet management. Initially, an on-board global positioning satellite (GPS) tracking computer of the system can prompt a driver or a fleet manager for example at the beginning of a journey to input information on vehicle configuration and load parameters (e.g., type of load and load height).

Once the journey has begun, the on-board GPS tracking computer can automatically locate the vehicle and determine its direction of travel and speed. From this position and direction information, the on-board GPS tracking computer can automatically select a road segment that the vehicle is traversing from a linked map database that contains Red-spots (based on accurate three dimensional characterizations of road centerlines, curve radii and slopes) and Black-spots. Current GPS tracking systems are not referenced to accurate 3D road maps (do not have a link to accurate road centerline data) nor do they have the vehicle dynamics algorithms to calculate RSS through curves, nor do they have the ability to calculate safe descent speeds on descents. Therefore, they cannot provide curve speed and descent speed advisories (predictions of MSS for upcoming curves and descents) or driver prompts.

The on-board GPS tracking computer with a path prediction application or software module (e.g., e-Horizon Module) then uses the foregoing information to automatically predict the path of the vehicle. Alternatively, it may use the route from the navigation system that is also in the GPS tracking computer. The on-board GPS tracking computer then monitors vehicle position and speed and automatically triggers alerts for the driver as it approaches a Black-spot or Red-spot. If it is a Red-spot, the active system will also provide RSS that the vehicle can use to transit a next road segment from the information on vehicle configuration and load parameters along with the pre-calculated speeds in the database (RSS could also be calculated in real time). The on-board GPS tracking computer can also automatically calculate the speed differential between actual speed and the RSS.

The alerts are also automatically issued with a look-ahead distance sufficient for the vehicle to be slowed to a safe speed for upcoming road segments (i.e., the time and distance required to decelerate through the differential speed). That is, the system can provide alerts to the driver with sufficient lead-time that the driver can slow the vehicle to a safe speed for the next maneuver. The required lead-time will be calculated by the system since it varies by the load, truck configuration, speed differential and the slope of the road. For example, for a larger speed differential and a downhill slope more time is required to slow the vehicle. Thus, the alert must be issued earlier.

The system then provides a safe speed to the driver and a point at which the vehicle must begin braking for the next road segment. If actual speed is higher than RSS past a certain point where the distance required to decelerate is reached, a warning is issued to the driver. These might include RSS displays and/or audible warnings for example. If the driver fails to heed the alert, additional warnings will be issued with increasing frequency and/or volume until corrective action is taken.

Combination Active/Passive System

In still another aspect, a combination system and method is disclosed for both monitoring and warning purposes. The combination passive/active system will display the RSS for the driver when the vehicle is traveling through a Red-spot and provide warnings with sufficient time for the driver to reduce speed to the RSS for the next maneuver. The combination passive/active system then records the driver's performance through the curve or downgrade for example. In similar fashion the combination passive/active system will issue alerts to the driver to proceed with caution when the vehicle approaches an accident Black-spot. The combination passive/active system will also access data from the CAN bus of the truck to alert the driver to possible deterioration in the condition of the road surface, such as being wet or the possibility of ice and will provide suggested speeds for such conditions. An additional feature of the combination passive/active system is that it will accumulate actual data on lateral accelerations on each curve from data logs of the accelerometers on the vehicle. Super elevation can be calculated by comparing actual measured lateral acceleration with predicted values. These data will be used to refine the suggested safe speeds for each curve. This avoids false warnings that would annoy the driver and reduce effectiveness. In addition, the combination passive/active system can be expanded to record fuel consumption and provide drivers with reports that show their fuel consumption compared to the best from that segment, as well as provide drivers with optimum speeds through the next segment with recommended throttle use, gear selection and braking to encourage driving behaviors that conserve fuel.

The combination passive/active system collects performance data (position, speed, lateral acceleration, driver actions and driver inputs) from the GPS and CAN bus. The performance data is sent by telemetry to the base unit of the GPS tracking system where it is accumulated in the driver's file in a database on a server. An automated system analyzes the trip (e.g., such an analysis could have a particular focus on truck performance in hotspots (segments with high curvature or slopes or high accident frequency)). Dangerous driving behavior is automatically flagged and reported to fleet management for immediate action. Repeated poor or marginal performance is accumulated and used as the basis for remedial driver training or other consequences. Good driver performance can be rewarded.

Figure 2:
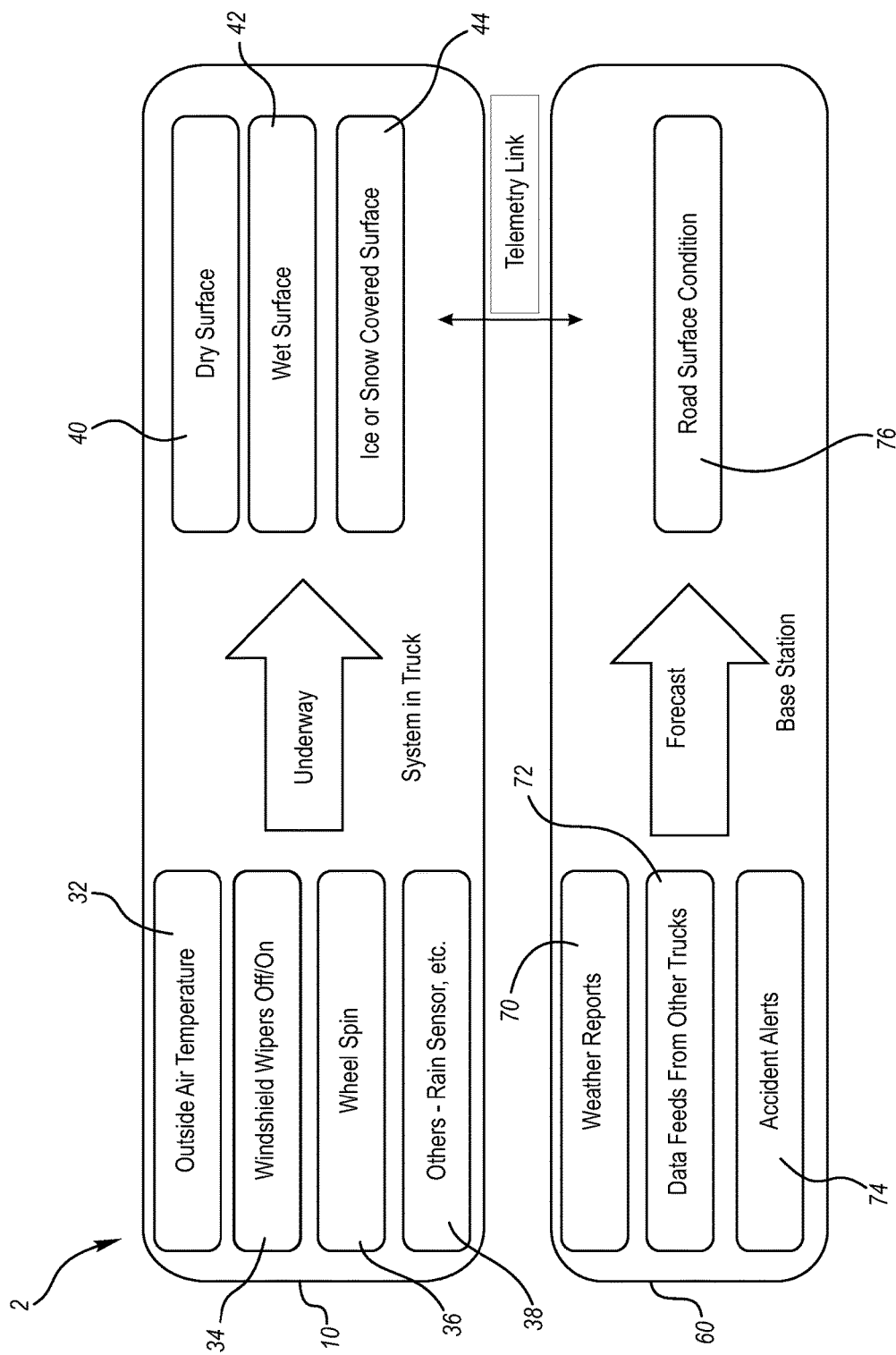
Figure 3:
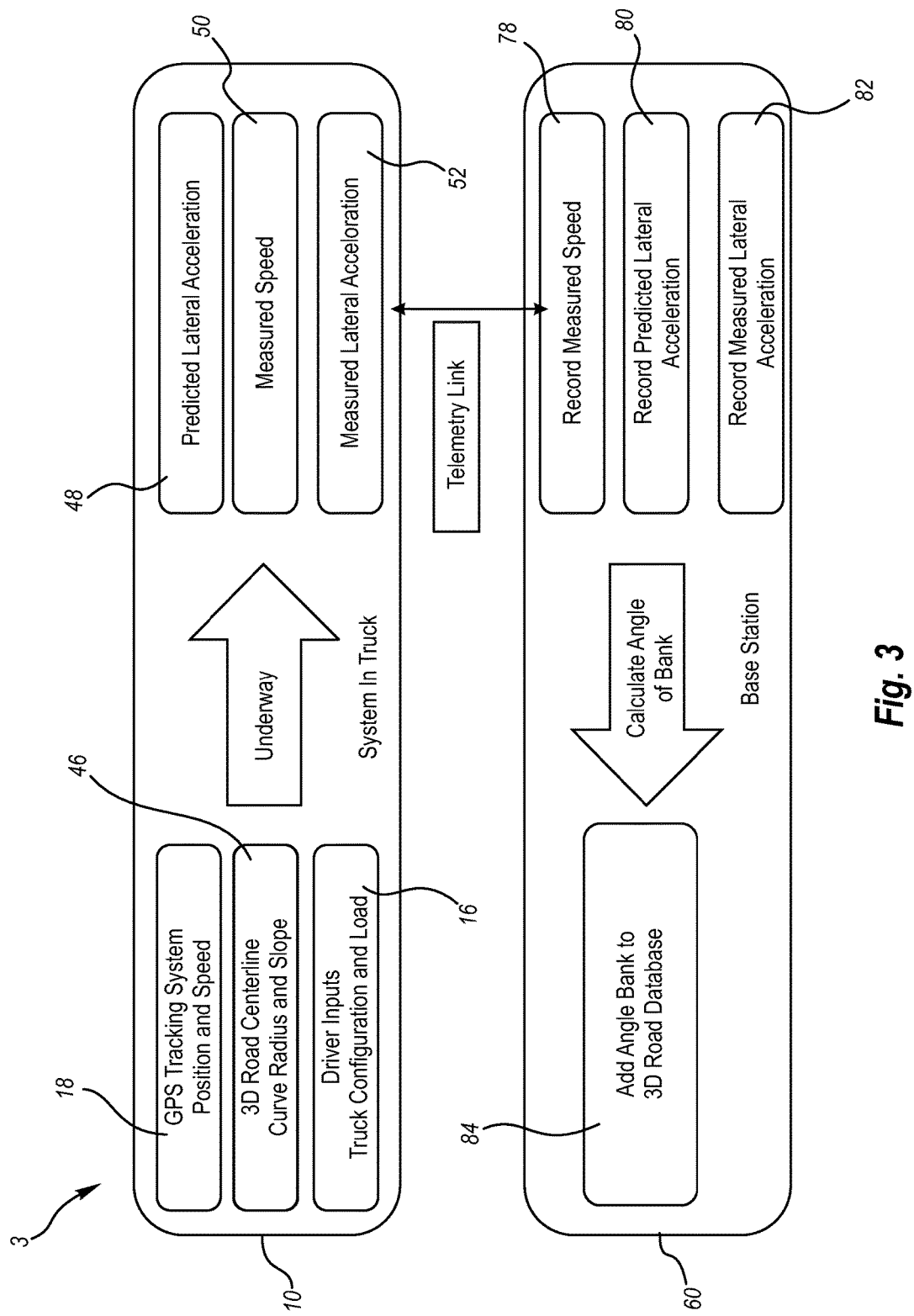

Specifically, and referring to FIGS. 1-3 and for the exemplary purposes of this disclosure, combination passive/active driver assessment and improvement system 1 is illustrated. Passive/active system 1 includes truck system 10 connected to a base station system 60 via telemetry link.

Truck system 10 of passive/active system 1 takes four sets of inputs 12, 14, 16, and 46, selects and displays actual speed 22, the RSS 24 for curves and downgrades on the road ahead from the data base of Red-spots 14, and predicted lateral acceleration 48, the actual measured speed through the curve 50, and the measured lateral acceleration 52, calculates the distance 28 and time 30 remaining to reduce speed to a target speed 26, and then records in base station system 60 the driver's use of the controls 64 (e.g., the driver's use of throttle and brakes), the performance of the truck 66, the RSS warnings and other alerts 62 given to the driver, the predicted lateral acceleration 80, the actual measured speed through the curve 78, and the measured lateral acceleration 82 for later use in driver performance assessment for example.

Driver performance records with respect to curves and slopes collected by system 1 are cumulative and can be used to improve driver behavior, especially when system 1 reports the driver behavior to the fleet manager who can use those records to take remedial action. System 1 also provides alerts 20 to the driver as the vehicle approaches an accident Black-spot and records the driver's behavior during the transit of the Black-spot.

System 1 also features e-Horizon module 18, which uses the position and speed 12 of the vehicle combined with the digital roadmaps incorporated in the GPS tracking system to predict the likely path of the vehicle.

Turning to FIG. 2 specifically, sub-system 2 of passive/active system 1 detects changes in the road surface 76 that could lower sliding friction and require a lower RSS for the curve. Sub-system 2 can access certain information from the CAN bus of the truck (e.g., outside air temperature 32, status of windshield wipers 34, wheel spin 36, other vehicle components 38, and the like) and can also receive information (e.g., weather reports 70, data feeds from other trucks 72, accident alerts 74, and the like) from home base station 60 by a telemetry link. This information can be used by passive/active system 1 to determine if the road surface is dry 40, wet 42, or icy 44, and a lower RSS can be posted to the driver.

Referring to FIG. 3 specifically, truck system 10 of sub-system 3 of passive/active system 1 collects data (e.g., predicted lateral acceleration 48, actual measured speed through the curve 50, measured lateral acceleration 52), and the like that is sent to home base station 60 by telemetry to allow passive/active system 1 to calculate the angle of bank for each curve on the route. The bank angle data will be accumulated, then averaged over multiple determinations, and then added as an input 84 to the map data 14 and 46. Additional inputs 84 for bank angle will be obtained from government sources and other remote sensing information (e.g., LIDAR). Thus, these inputs 84 will improve the 3D road map information and refine the RSS for each curve. This will help avoid false warnings that would annoy the driver and reduce effectiveness.

Sub-system 3 is a feed back loop system that calculates the angle of bank for each curve on the route. Turning to FIG. 4A, the forces acting on a loaded truck trailer negotiating a horizontal curve and the formula for calculating the overturning moment is illustrated. The formula is:

$$CF=mv^2/r$$

where "CF" is centrifugal force, "R" is resultant, "W" is weight, "m" is mass, "v" is speed, and "r" is radius of turn. As long as "R" stays inside the outer wheels the truck will not overturn. The initial database will assume all curves or turns are horizontal. This will be the baseline.

Figure 4B:
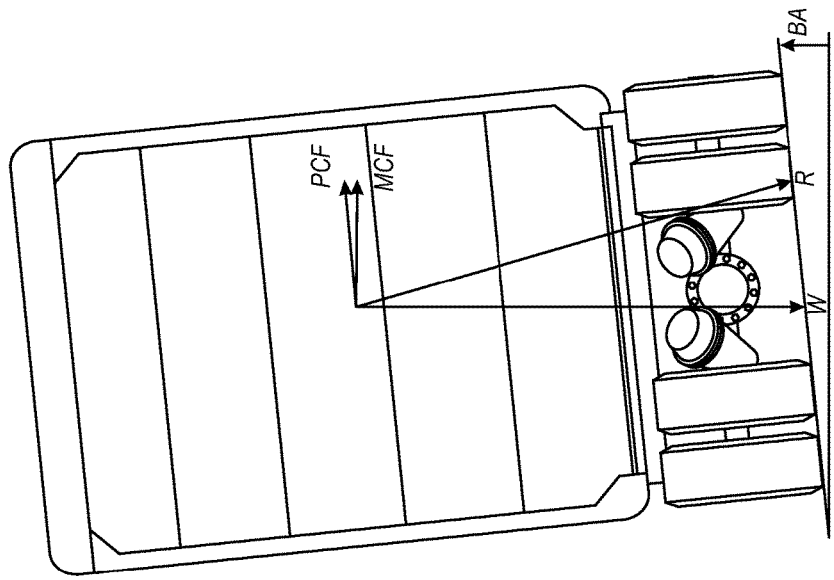
FIGS. 4A-4B depict the forces acting on a loaded truck trailer negotiating a curve and the forces acting on a loaded truck trailer negotiating a curve with an angle of bank, respectively.
Figure 4A:
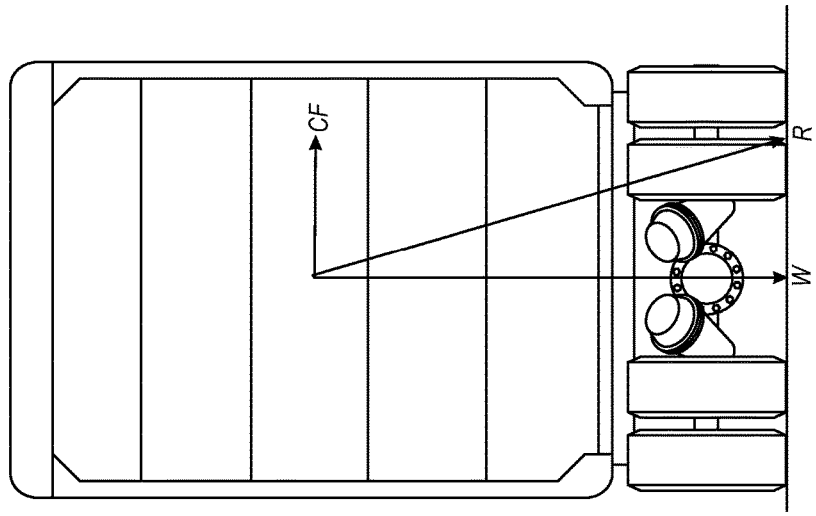

FIG. 4B is an illustration of the forces acting on a loaded trailer negotiating a curve with an angle of bank and the formula for calculating the angle of bank. The formula is:

$$BA = \text{arc cosign } MCF/PCF$$

where "BA" is angle of bank, "MCF" is measured centrifugal force, and "PCF" is predicted centrifugal force. The difference in the PCF and MCF can be used to determine the BA in the turn.

Figure 6A:
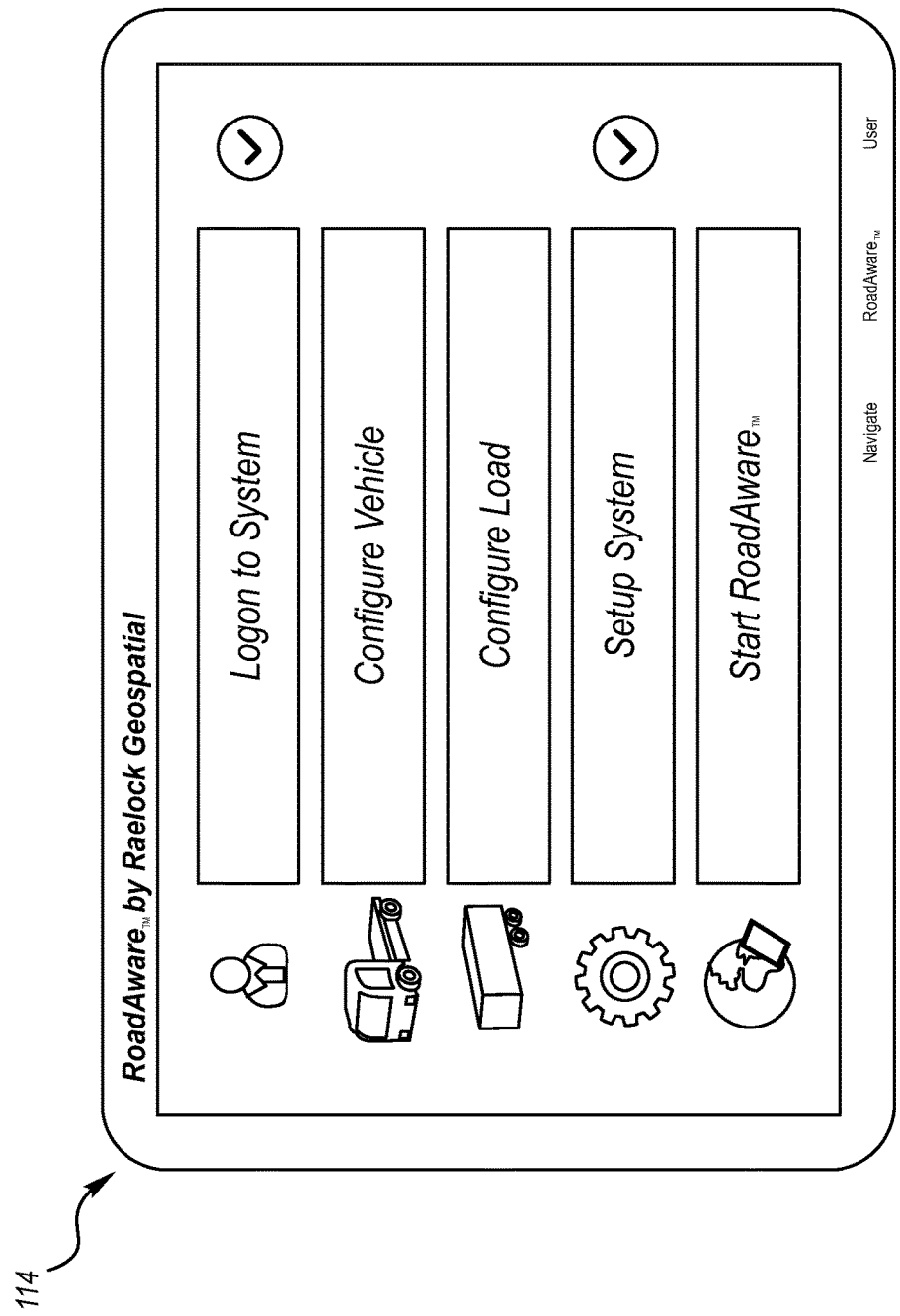
FIG. 6A illustrates a set-up screen shot of another driver performance assessment and improvement system.
Figure 6B:
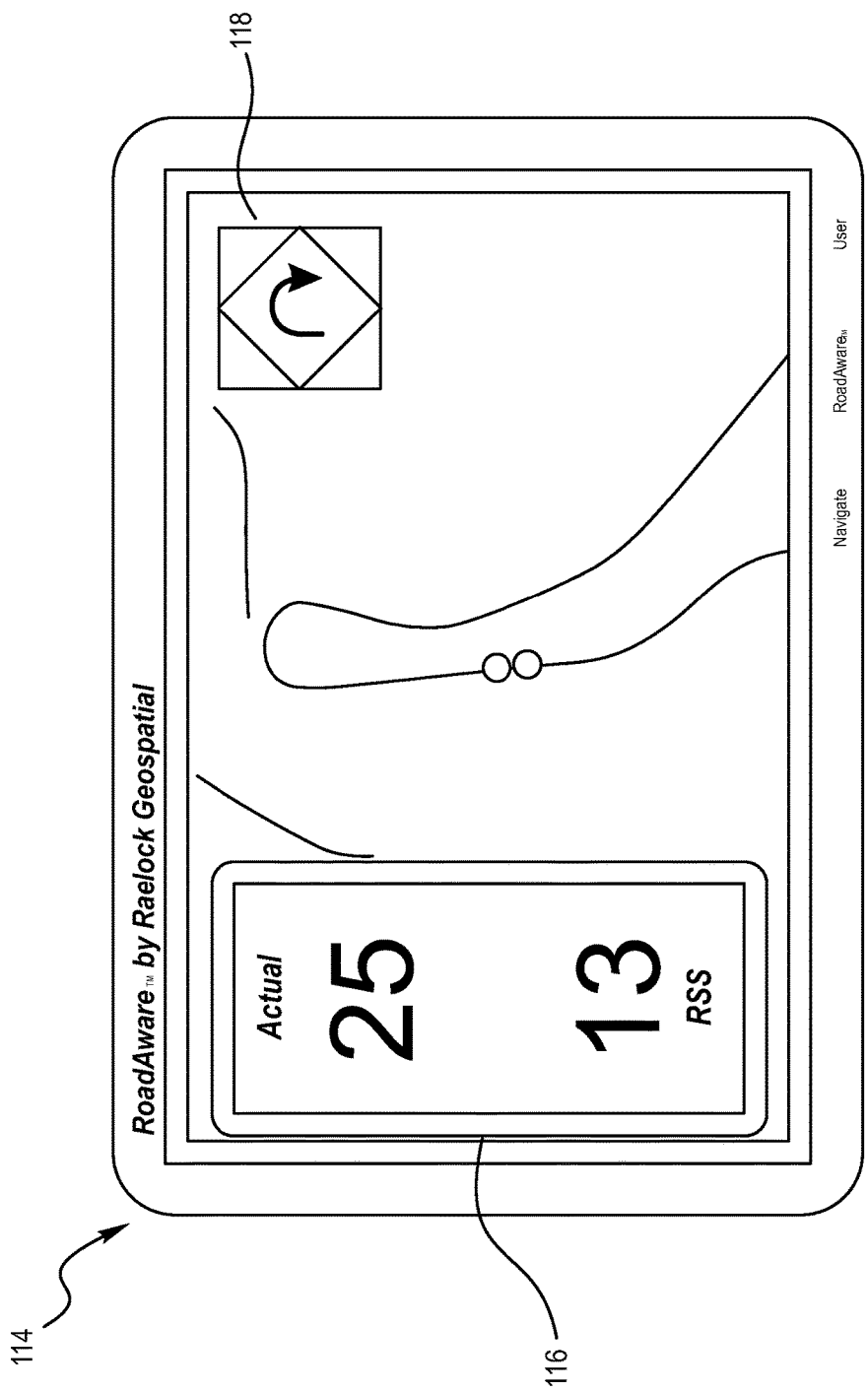
FIG. 6B illustrates an in-use screen shot of the driver performance assessment and improvement system.

Turning to FIGS. 6A-6B and for the exemplary purposes of this disclosure, a particular commercial implementation of a combination passive/active driver performance assessment and improvement system is illustrated, coined "RoadAware™" system 5.

RoadAware™ system 5 is employed for improving driver performance in commercial fleet management. RoadAware™ system 5 is a forward-looking system designed to be added to GPS tracking and fleet management services. It transforms existing hardware into a proactive device that provides alerts and vehicle specific recommended safe speeds for upcoming hazards, based on vehicle and load dynamics and road geometry. RoadAware™ system 5 is an extra set of eyes on the road designed to warn drivers of dangerous situations while there is still time to take corrective action.

The goal of RoadAware™ system 5 is to provide drivers with additional tools that will make their jobs easier and safer without adding new hardware to the truck. To accomplish this, RoadAware™ system 5 software is designed to work with existing hardware provided by GPS tracking and fleet management companies. It uses a national data base of Red-Spots created from precise 3-D maps, and other hazard data.

The heart of the RoadAware™ system 5 is the e-Horizon module. The e-Horizon Module continually tracks the position of the vehicle in relation to a map database that contains very accurate road centerline geometry. The database also contains recommended safe speeds that are calculated by using engineering dynamics for the specific vehicle weight and configuration. This continuous virtual look ahead and evaluation process ensures the vehicle is able to safely navigate every upcoming geometry and stop at all times.

The module calculates recommended safe speeds for descents based upon the braking horsepower of the engine, the weight of the load, and the steepness of approaching grades. Safe speeds in curves are calculated based upon the rate of curvature of the road, the trailer configuration, the load weight, and the approximate height of the center of gravity. Highly precise road centerline geometry is prepared specifically for this application.

System 5 is an on-board GPS tracking computer (a computer platform as previously described) that includes input keys 110, speakers 112, and display 114.

In FIG. 6A, a set-up screen shot of system 5 is illustrated; a driver will see before the start of a journey. Initially, on-board GPS tracking computer 5 can prompt a driver or a fleet operations worker or manager for example at the beginning of a journey to input information on vehicle configuration and load parameters (e.g., type of load and load height). The fleet manager also can make a number of system policy decisions that are driver or fleet specific when system 5 is initially set up in the vehicle. These include such things as the percentage of engine braking horsepower that will be used in calculating descent speeds, the maximum lateral force for various load configurations that will be used in calculating curve speeds and the lead-time that will be allowed for audible and visual alerts for the driver.

With system 5 being configured and route information downloaded off the server, the trip can begin. In FIG. 6B, an in-use screen shot of system 5 is illustrated. Once the journey has begun, on-board GPS tracking computer 5 can automatically locate the vehicle and determine its direction of travel and speed. From this position and direction information, on-board GPS tracking computer 5 can automatically select a road segment that the vehicle is traversing from a linked map database that contains Red-spots (based on accurate three dimensional characterizations of road centerlines, curve radii and slopes) and Black-spots. On-board GPS tracking computer 5 with a path prediction application or software module then uses the foregoing information to automatically predict the path of the vehicle.

On-board GPS tracking computer 5 then monitors vehicle position and speed and automatically triggers alerts for the driver as it approaches a Black-spot or Red-spot. For example, as depicted in FIG. 6B, if it is a Red-spot, then in the speed display 116 it will provide the actual speed and the RSS that the vehicle can use to transit a next road segment from the information on vehicle configuration and load parameters along with the pre-calculated speeds in the database. On-board GPS tracking computer 5 can also automatically calculate the speed differential between actual speed and the RSS.

On-board GPS tracking computer 5 can provide alerts to the driver with sufficient lead-time that the driver can slow the vehicle to a safe speed for the next maneuver, such as a visual warning 118 of upcoming road geometry (e.g. curve sign).

Figure 6C:
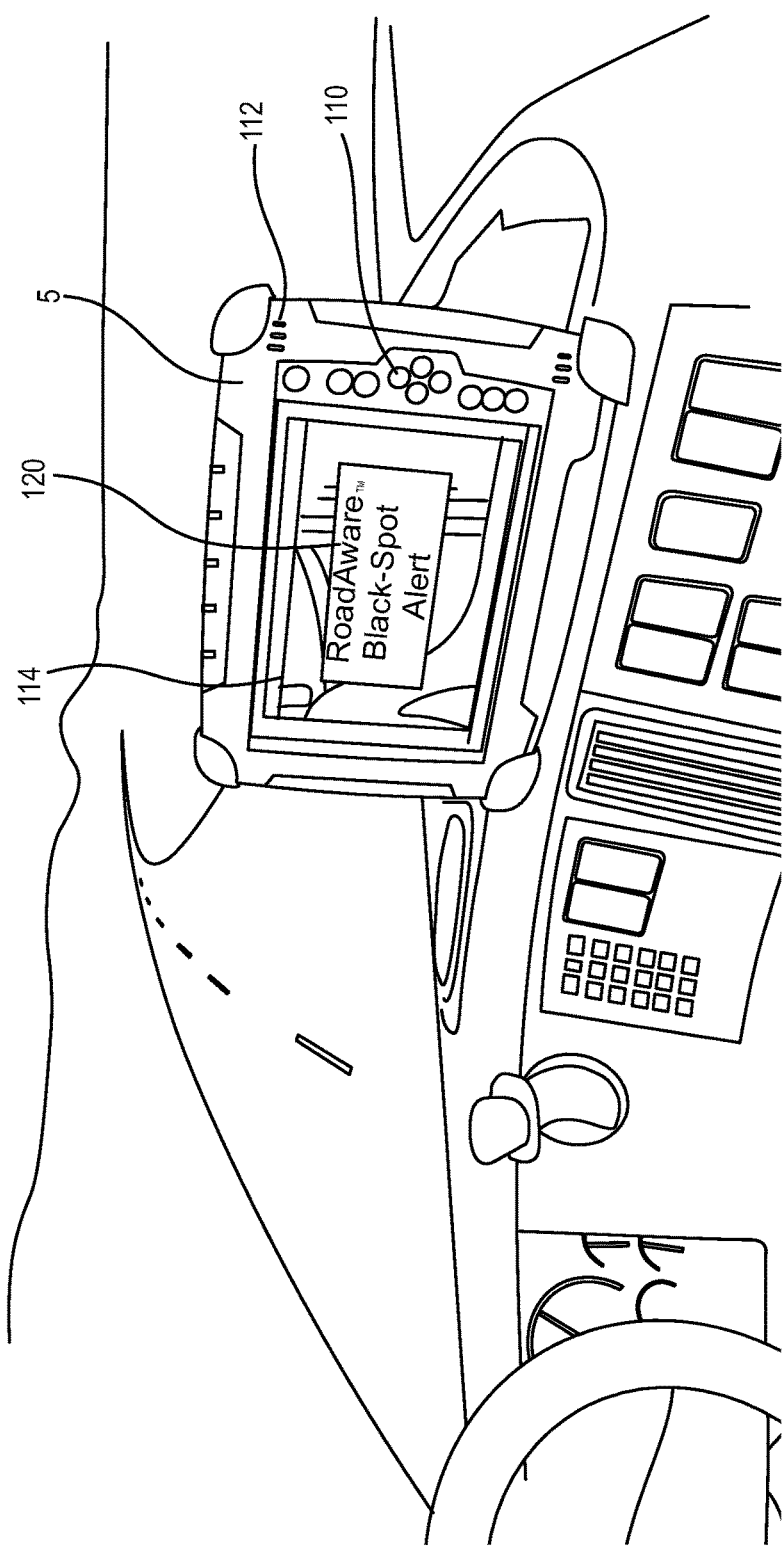
FIG. 6C illustrates an in-use view, including screen shot, of the driver performance assessment and improvement system.

FIG. 6C illustrates an in-use view, including screen shot, of system 5. As depicted in FIG. 6C, if it is a Black-spot, computer 5 will provide alert 120 for example and possibly a message about the particular Black-spot.

On-board GPS tracking computer 5 then provides a safe speed to the driver and a point at which the vehicle must begin braking for the next road segment or Black-spot. If actual speed is higher than RSS past a certain point where the distance required to decelerate is reached, a warning is issued to the driver. These might include color warnings (e.g. change in the color of speed box 116) and/or audible warnings (e.g. "Slow down to miles per hour.") for example. If the driver fails to heed the alert, additional warnings will be issued with increasing frequency and/or volume until corrective action is taken. Thus, the driver alerts can be varied in intensity and/or color (e.g., green, yellow, red) for example to reflect the speed a driver is approaching an upcoming section of roadway.

For example, the speed display 116 can turn from green to yellow warning that a driver is travelling faster than the calculated RSS for upcoming geometry. If those speed warnings are not heeded, the speed display 116 can turn from yellow to red while the driver still has the opportunity to take corrective action.

Thus, the primary goal of system 5 is to help fleet managers and drivers reduce accident related costs, reduce injuries, and save lives. Inside the cab, this is accomplished by making the vehicle self aware, providing proactive warnings to drivers before it is too late to take corrective action. Outside the cab, system 5 regularly communicates trip information back to the server and fleet management. This timely information can inform Fleet Management of dangerous driving incidents as they occur, or can be used to score drivers and reward them for good driving habits, and to help create training programs tailored to specific driver needs.

Cooperative System

Figure 5:
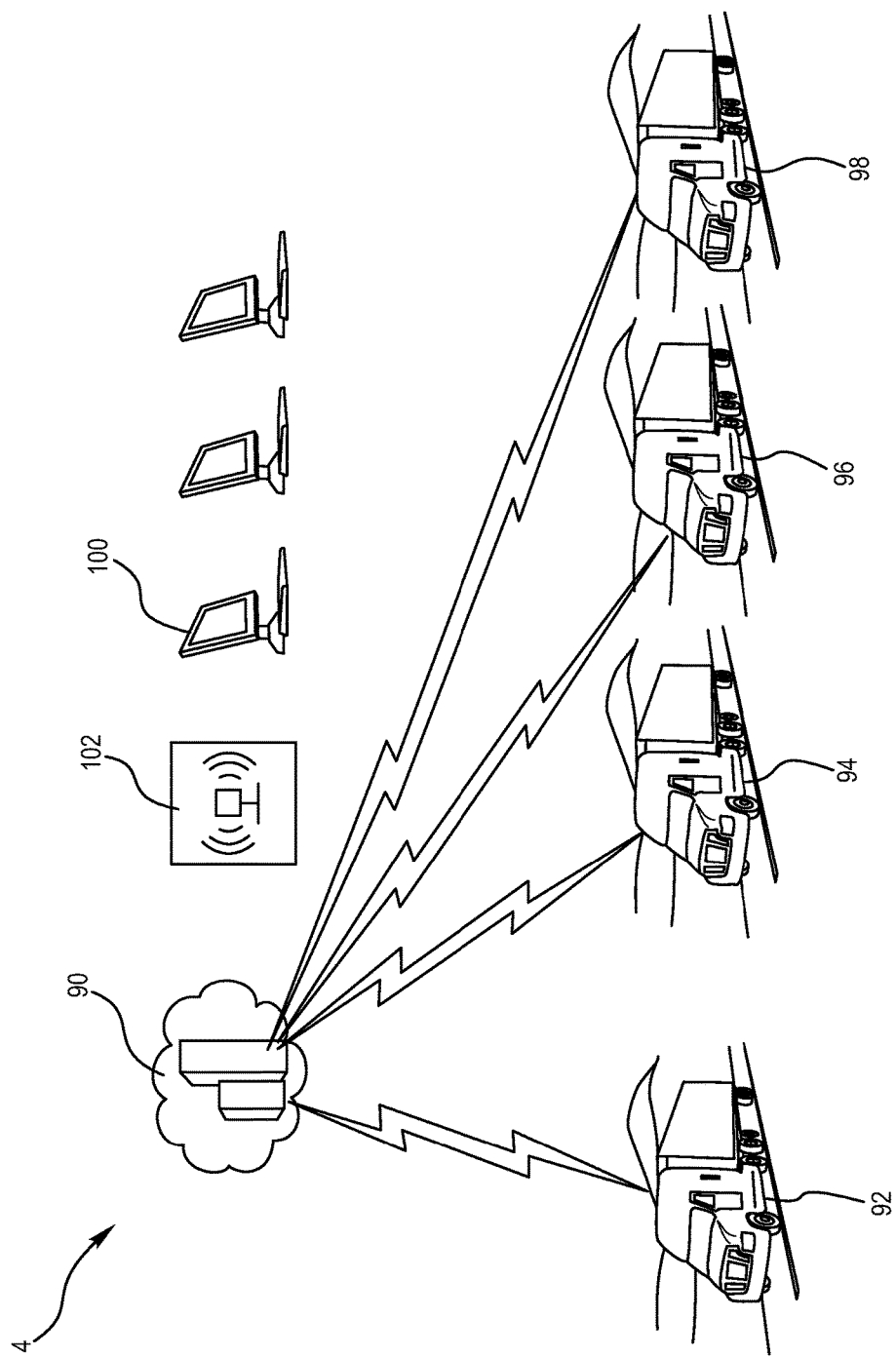
FIG. 5 is a diagram of a cooperative driver performance assessment and improvement system.

Turning to FIG. 5 and for the exemplary purposes of this disclosure, a particular cooperative implementation of a driver performance assessment and improvement system is illustrated.

Cooperative system 4 includes a passive and/or active system implementation as previously described in each of host vehicle 92 and recipient vehicles 94-98. Base station 90 includes a server that connects to host vehicle 92 and recipient vehicles 94-98 via a telemetry link and connects to fleet manager and other computers via a wired or wireless connection. In this implementation, a wireless connection or network 102 is used.

So, Cooperative system 4 will not only enable driver alerts based upon the position speed and dynamics of the host vehicle 92, but it can also facilitate data exchanges between nearby recipient vehicles 94-98 so that systems in close proximity can work in a cooperative manner. What makes cooperative system 4 different than conventional systems is that it is using existing, installed GPS Tracking system hardware as the platform and it is sharing information that will assist in vehicle stability and braking assessments.

Cooperative system 4 provides an automated method to resolve conflicts between vehicles. Cooperative system 4 takes advantage of the self-aware capabilities of each vehicle, radio communication and computers. Simply stated, each vehicle continuously reports its position, speed and direction of travel to all vehicles in the vicinity (say 5 miles for example). Each recipient system then calculates where the vehicle will be if it continues on that course and whether there may be a conflict with the host vehicle. If a potential conflict exists, the driver is alerted.

Thus, an active GPS tracking system can become part of a cooperative system by broadcasting its position speed and direction to all vehicles in its vicinity. The recipient systems can then calculate whether there is a potential conflict (e.g., intersections or slow traffic ahead due to traffic, construction or weather for example).

Obviously, cooperative systems become most effective when all vehicles on the road are equipped with the technology. However, some immediate gains will be achieved when several fleet managers adopt cooperative systems technology. For example, cooperative system 4 can issue an emergency alert in the event of a hard braking, airbag deployment, road departure, loss of traction, or crash for example, thus ensuring that following vehicles do not compound the damage by crashing into a traffic tailback or leaving the same section of road due to icy conditions. Similarly, drivers will be automatically warned when there is slow traffic, thus, avoiding the catastrophic rear end crashes when a driver comes around a bend in the road and finds a traffic tailback.

There is a critical mass argument for the adoption of cooperative systems. The GPS tracking companies are likely the only companies with sufficient numbers of systems already deployed to overcome the critical mass issue. For example, the US has about 5 million miles of paved roads but only 250,000 miles are Class 1 and Class 2 highways. Thus, if a GPS tracking company has 100,000 vehicles equipped with cooperative system 4 for example, and those vehicles are evenly distributed over the Class 1 & 2 highways, there will be a truck broadcasting every 2.5 miles.

Using existing GPS tracking computer systems to implement cooperative system 4 for example offers several advantages: Faster ramp up as it can be added to existing systems in over 1 million trucks in the US today; In truck implementation ramp up is constrained by fleet replacement cycles; Immediate performance improvement when the driver knows performance is being measured and reported; and Starting with accurate road geometry reduces the need for probe data.

Thus, passive and/or active system implementations extend driver performance monitoring and behavior improvement to the most hazardous segments of the roadway for heavy trucks, namely curves and down slopes. The potential number of lives that can be saved on US roadways alone is over 300 per year. The economic losses that can be saved through deployment of this invention are $5 billion per year in the US. Similar savings can be expected in Europe.

Through the addition of accurate road centerline geometry it is possible to calculate the RSS for a large truck with a given load and configuration to safely negotiate upcoming curves or down grades.

Alerts can be provided to the driver with sufficient notice to allow the driver to reduce to the RSS displayed by the passive and/or active system.

Since sliding friction varies widely with the condition of the surface, the passive and/or active system can also access data from the CAN bus to lower the recommended safe speed if data inputs suggest the road surface may be wet or icy.

The passive and/or active system then records the driver's use of the controls and the truck performance through the maneuver. The recorded information is then transmitted via the GPS tracking system to the fleet headquarters where it is used to assess driver performance. The fleet manager is then able to use that information in a decision tree that may have several outcomes ranging from no action to a warning and remedial training or in extreme cases dismissal.

Many additional implementations are possible. Further implementations are within the CLAIMS.

This disclosure, its aspects and implementations, are not limited to the specific components or procedures disclosed herein. Accordingly, for example, although particular components and procedures are disclosed, such may comprise any style, type, model, version, quantity, and/or the like as is known in the art for such components, consistent with the intended operation of systems and methods for driver performance assessment and improvement.

For example, passive and/or active system implementations may include a software system installed as an upgrade to existing GPS tracking system computers that will access specific vehicle information from the CAN bus and certain driver inputs plus the geometry of the roadway for a certain distance (1 to 5 miles) in front of the vehicle. The software system will calculate the RSS for each curve ahead of the vehicle. Upgrading existing GPS tracking system computers to for use in passive and/or active system implementations offers advantages. There will be faster ramp up as the upgrade can be added to existing systems in over 1 million trucks in the US today (ramp up is not constrained by fleet replacement cycles). There also is an immediate performance improvement when the driver knows performance is being measured and reported.

Implementations of systems and methods for driver performance assessment and improvement are particularly useful in applications using GPS tracking services in countries or territories where accurate road centerline data exists, such as for fleet managers at trucking companies. However, implementations are not limited to these uses and applications. Rather, any such description is for the exemplary purposes of this disclosure, and implementations may also be used in a variety of applications with similar results.

In places where the description above refers to particular implementations, it should be readily apparent that a number of modifications may be made without departing from the spirit thereof and that these implementations may be applied to other applications. The presently disclosed implementations are, therefore, to be considered in all respects as illustrative and not restrictive.

The invention claimed is:

1. A driver improvement method comprising:
one of inputting via a global positioning satellite (GPS) enabled computer and pre-installing onto the GPS enabled computer information on vehicle configuration and load parameters;
automatically, via the GPS enabled computer, locating the vehicle and determining its direction of travel and speed once driving is underway;
automatically, via the GPS enabled computer, selecting a road segment that the vehicle is traversing from a linked map data base that contains accurate three dimensional characterizations of road centerlines, curve radii and slopes;
automatically, via the GPS enabled computer, calculating a recommended safe speed (RSS) or selecting the RSS from a data base that has been created by previously calculating the RSS that the vehicle can use to transit a next road segment from the information on vehicle configuration and load parameters along with the curve radii and slopes; and
automatically, via the GPS enabled computer, providing the RSS to a driver in the form of an alert.

2. The method of claim 1 wherein selecting a road segment that the vehicle is traversing comprises selecting a road segment that the vehicle is traversing from a linked map data base that contains accurate three dimensional characterizations of road centerlines, curve radii and slopes, and pre-calculated RSSs for various vehicle types, loads and trailer configurations.

3. The method of claim 1 further comprising automatically, via the GPS enabled computer, predicting the path of the vehicle.

4. The method of claim 1 wherein the GPS enabled computer is an on-board GPS enabled computer.

5. The method of claim 1 wherein the GPS enabled computer is one of a factory installed navigation system, a factory installed GPS tracking system, an after-market stand-alone GPS navigation system, an after-market stand-alone GPS tracking system, a smartphone, and a tablet computer.

6. The method of claim 1 further comprising:
- automatically, via the GPS enabled computer, recording actual measurements of lateral accelerations for each road segment and comparing the actual measurements to predicted lateral accelerations;
- automatically, via the GPS enabled computer, estimating calculating bank angles by a difference between the measured lateral accelerations and the predicted lateral accelerations; and
- automatically, via the GPS enabled computer, adding the bank angles to the database to improve subsequent forecasts of RSS.

* * * * *

UNITED STATES PATENT AND TRADEMARK OFFICE
CERTIFICATE OF CORRECTION

PATENT NO. : 9,613,466 B1
APPLICATION NO. : 14/047980
DATED : April 4, 2017
INVENTOR(S) : Brian Lee Bullock Page 1 of 1

It is certified that error appears in the above-identified patent and that said Letters Patent is hereby corrected as shown below:

In the Claims

Column 17, Line 24, for the claim reference 'computer, estimating' should read - computer, -

Signed and Sealed this
Fourteenth Day of August, 2018

Andrei Iancu
*Director of the United States Patent and Trademark Office*